US012638321B2

(12) United States Patent
Kanegae et al.

(10) Patent No.: US 12,638,321 B2
(45) Date of Patent: May 26, 2026

(54) SENSOR ELEMENT

(71) Applicant: KOA CORPORATION, Nagano (JP)

(72) Inventors: Satoshi Kanegae, Nagano (JP);
Katsuya Miura, Nagano (JP); Isao Nagasaka, Nagano (JP)

(73) Assignee: KOA CORPORATION, Nagano (JP)

( * ) Notice: Subject to any disclaimer, the term of this patent is extended or adjusted under 35 U.S.C. 154(b) by 310 days.

(21) Appl. No.: 18/290,501

(22) PCT Filed: May 10, 2022

(86) PCT No.: PCT/JP2022/019823
§ 371 (c)(1),
(2) Date: Nov. 14, 2023

(87) PCT Pub. No.: WO2022/244653
PCT Pub. Date: Nov. 24, 2022

(65) Prior Publication Data
US 2024/0247960 A1     Jul. 25, 2024

(30) Foreign Application Priority Data

May 20, 2021     (JP) .................................. 2021-085160

(51) Int. Cl.
*G01F 1/692*     (2006.01)
(52) U.S. Cl.
CPC .................................... *G01F 1/692* (2013.01)
(58) Field of Classification Search
CPC . G01F 1/692; G01F 1/69; G01F 1/696; G01P 5/12
See application file for complete search history.

(56) References Cited

U.S. PATENT DOCUMENTS 6,557,411 B1     5/2003    Yamada et al.
8,627,717 B2 *     1/2014    Asano ..................... G01F 1/692
                                          73/204.26
(Continued)

FOREIGN PATENT DOCUMENTS

CN          104482971 A      4/2015
CN          112513599 A      3/2021
(Continued)

OTHER PUBLICATIONS

International Search Report issued in WIPO Patent Application No. PCT/JP2022/019823, dated Jul. 19, 2022, along with an English translation thereof.

*Primary Examiner* — Laura Martin
*Assistant Examiner* — Julia Fitzpatrick
(74) *Attorney, Agent, or Firm* — GREENBLUM & BERNSTEIN, P.L.C.

(57)     ABSTRACT

Provided is a sensor element capable of obtaining a wide sensing region, suppressing unevenness of a temperature distribution in the sensing region, and obtaining substantially constant sensor sensitivity. A sensor element according to the present invention includes: a base; a temperature-sensitive film formed on an entire surface of the base and having an electric resistance value that changes due to a change in temperature; and wiring members connected to both ends of the temperature-sensitive film. The temperature-sensitive film includes connection regions connected to the wiring members and a pattern extending from each of the connection regions toward a center of the base, and a cross-sectional area of the pattern is smaller on the connection region sides than at the center of the base.

1 Claim, 6 Drawing Sheets

(56)         References Cited

U.S. PATENT DOCUMENTS

| | | | | |
|---|---|---|---|---|
| 2006/0048568 A1* | 3/2006 | Korniyenko | ............ | G01F 1/692 |
| | | | | 73/204.22 |
| 2015/0285666 A1* | 10/2015 | Knittel | ................. | G01F 1/6845 |
| | | | | 73/204.26 |
| 2020/0400476 A1* | 12/2020 | Okiyama | ............. | G01F 11/282 |
| 2021/0223114 A1 | 7/2021 | Nojiri | | |

FOREIGN PATENT DOCUMENTS

| | | | | | |
|---|---|---|---|---|---|
| DE | 102017116309 A1 * | 1/2019 | ......... | B60B 27/0052 |
| JP | 61-133866 A | 6/1986 | | |
| JP | 1-109221 | 4/1989 | | |
| JP | H04116464 A * | 4/1992 | | |
| JP | H0921668 A * | 1/1997 | | |
| JP | H10197304 A * | 7/1998 | ............ | G01F 1/692 |
| JP | 2000-275078 A | 10/2000 | | |
| JP | 2001-41790 A | 2/2001 | | |
| JP | 2007285928 A * | 11/2007 | ............ | G01F 1/692 |
| JP | 4201861 B2 * | 12/2008 | | |
| JP | 2012032247 A * | 2/2012 | ............ | G01F 1/692 |
| JP | 2020-3354 A | 1/2020 | | |
| JP | 2020-8370 A | 1/2020 | | |
| JP | 2020139835 A * | 9/2020 | | |
| WO | WO-03093838 A1 * | 11/2003 | ............ | G01F 1/699 |
| WO | WO-2013136856 A1 * | 9/2013 | ........... | G01F 1/6845 |

* cited by examiner

CALCULATED
VALUE

TEMPERATURE DISTRIBUTION

SENSING REGION

TEMPERA-
TURE (°C)

--- COMPARATIVE EXAMPLE

— EXAMPLE 2

— EXAMPLE 1

MEASUREMENT POINT

ACTUAL MEASURED
VALUE

TEMPERATURE DISTRIBUTION
SENSING REGION

TEMPERA-
TURE (°C)

38
37
36
35
34
33

MEASUREMENT POINT

SENSOR ELEMENT

TECHNICAL FIELD

The present invention relates to, for example, a sensor element capable of measuring a wind speed.

BACKGROUND ART

There is known a thermal sensor element that exposes a heated resistance element for flow rate detection to a fluid and detects a flow rate of the fluid based on heat dissipation at that time. For example, Patent Literatures 1 and 2 disclose a wind state measuring apparatus in which a plurality of temperature-sensitive elements are dispersively attached to a surface of a housing having a circular sectional shape, the plurality of temperature-sensitive elements receive a thermal influence from outside air by performing heat exchange with outside air due to heat conduction, and an orientation and speed of wind that flows around the housing are measured. In Patent Literatures 1 and 2, a heater is included in the housing in order to heat the temperature-sensitive elements.

CITATION LIST

Patent Literature

Patent Literature 1: JP 2020-8370 A
Patent Literature 2: JP 2020-3354 A

SUMMARY OF INVENTION

Technical Problem

However, in the configurations of Patent Literatures 1 and 2, a plurality of temperature-sensitive elements are attached to the surface of the housing, and the flow rate can be measured only in a region where wind hits the temperature-sensitive elements, and the sensing range is limited.

Further, in the configurations of Patent Literatures 1 and 2, all wirings of a large number of temperature-sensitive elements arranged on the surface of the housing are drawn out to the lower end of the housing, and heat dissipation increases near the lower end. For this reason, the temperature of the temperature-sensitive element disposed near the lower end of the housing is likely to be lower than that of the temperature-sensitive element disposed above and away from the lower end of the housing. As a result, the unevenness of the temperature distribution of each temperature-sensitive element increased. As described above, there is a problem that sensor sensitivity in the vicinity of the lower end and sensor sensitivity in the vicinity of the upper end of the housing easily differ.

Therefore, the present invention has been made in view of the above problems, and an object of the present invention is to provide a sensor element capable of obtaining a wide sensing region, suppressing unevenness of a temperature distribution in the sensing region, and obtaining substantially constant sensor sensitivity.

Solution to Problem

A sensor element includes: a base; a temperature-sensitive film formed on an entire surface of the base and having an electric resistance value that changes due to a change in temperature; and a wiring member connected to both ends of the temperature-sensitive film. The temperature-sensitive film includes connection regions connected to the wiring member and a pattern extending from each of the connection regions toward a center of the base, and a cross-sectional area of the pattern is formed smaller on the connection region sides than at a center of the base.

Advantageous Effects of Invention

In the sensor element of the present invention, the temperature-sensitive film was formed on the entire surface of the base. In the temperature-sensitive film, a pattern extended from the connection regions located at both ends toward the center of the base, and the cross-sectional area of the pattern was smaller on the connection region side than at the center of the base. This makes it possible to increase heat generation in the vicinity of the connection regions. As described above, a sensing region can be widened, and unevenness of a temperature distribution in the sensing region can be improved, and substantially constant sensor sensitivity can be obtained.

DESCRIPTION OF EMBODIMENTS

Figure 1:
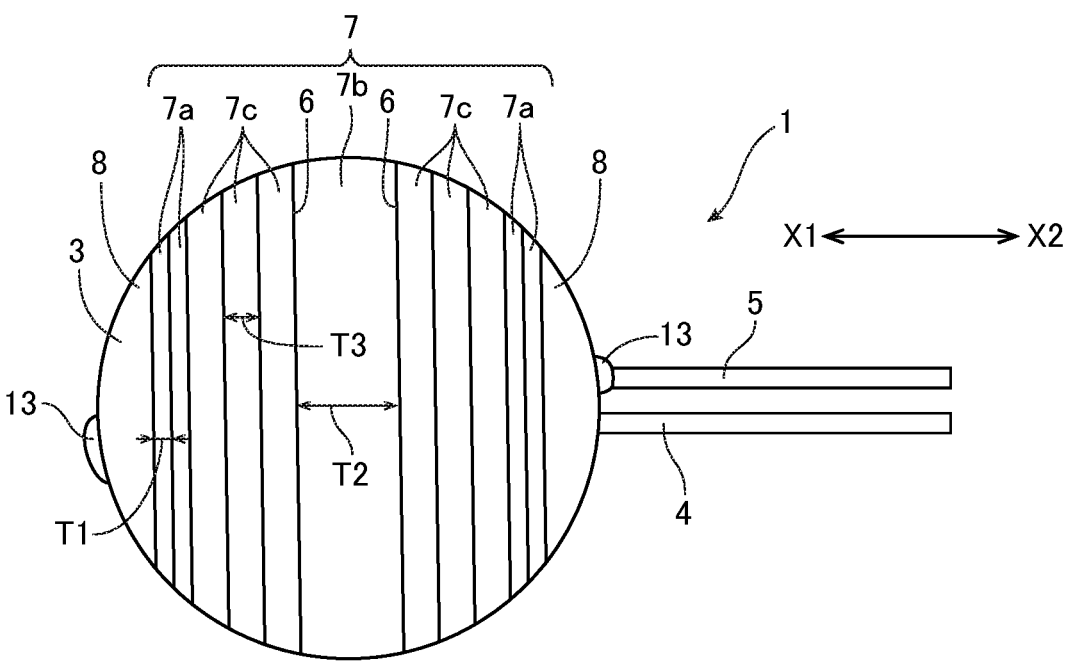
FIG. 1 is a side view of a sensor element according to the present embodiment.

An embodiment (hereinafter simply referred to as an "embodiment") of the present invention is described in detail below. The present invention is not limited to the following embodiments, and various modifications can be made within the scope of the gist thereof. In the drawings described below, some dimensional ratios are changed for convenience of description.

Overview of Sensor Element 1 According to Present Embodiment

Figure 2:
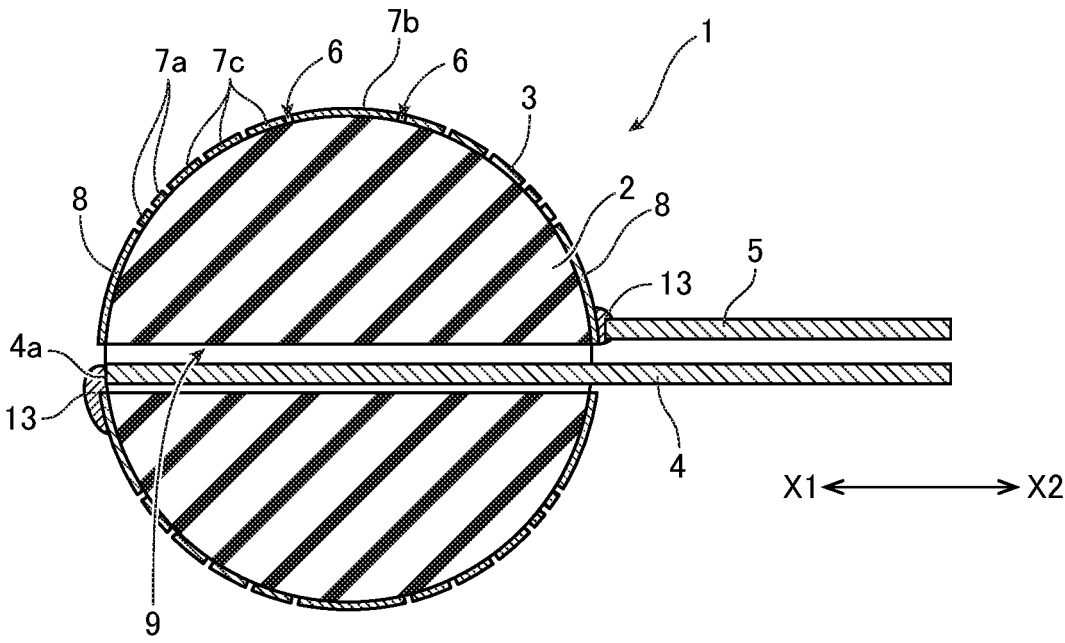
FIG. 2 is a cross-sectional view of the sensor element illustrated in FIG. 1.

A sensor element 1 according to the present embodiment is a thermal flow rate sensor element. As illustrated in FIGS. 1 and 2, the sensor element 1 includes an electrically insulating base 2, a temperature-sensitive film 3 formed on an entire surface of the base 2, and a first wiring member 4 and a second wiring member 5 connected to the temperature-sensitive film 3.

The base 2 of the present embodiment is, for example, spherical. The material of the base 2 is not particularly limited, as long as the material is an electrical insulator. As an example, the base 2 is formed of, for example, ceramics. Furthermore, the diameter of the base 2 is not limited, and can be variously adjusted depending on the purposes of use. As an example, the base 2 can have a diameter of about 4 mm.

As illustrated in FIG. 2, a through-hole 9 is formed in the base 2 and penetrates in an X1-X2 direction in the base 2.

The temperature-sensitive film 3 formed on the entire surface of the base 2 has an electric resistance value that changes due to a change in temperature. The temperature-sensitive film 3 is maintained at a high temperature due to conduction between the wiring members 4 and 5, and is controlled such that the electric resistance value of the temperature-sensitive film 3 changes as the temperature of the temperature-sensitive film 3 decreases when air strikes.

The material of the temperature-sensitive film 3 is not limited, but a platinum (Pt) film is preferable. By using the platinum film, degradation over time can be reduced. Therefore, the temperature-sensitive film 3 made of platinum and having high durability can be formed over the entire surface of the base 2. In addition, a nickel (Ni) film can be selected.

Figure 3:
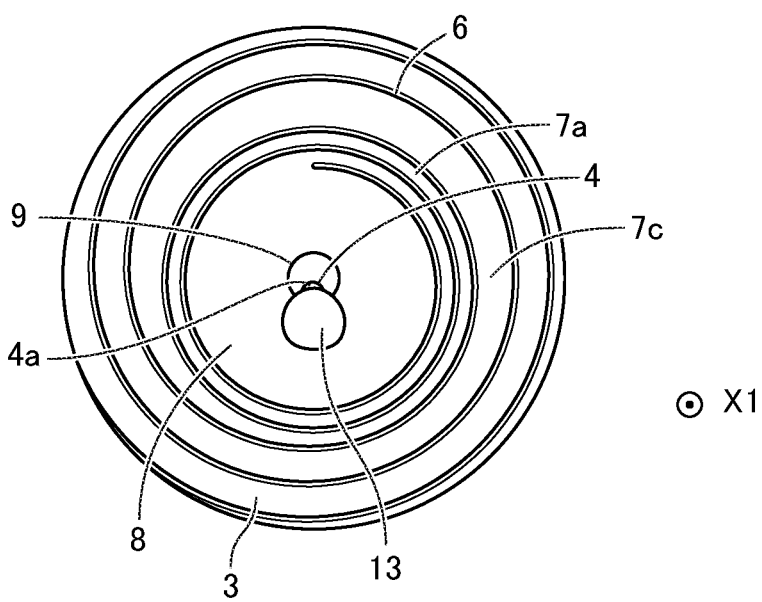
FIG. 3 is a front view of the sensor element according to the present embodiment.

As illustrated in FIGS. 2 and 3, the first wiring member 4 passes through the through-hole 9 of the base 2, and an end portion 4a of the first wiring member 4 on the X1 side and the temperature-sensitive film 3 are electrically connected to each other via a conductive film 13. The conductive film 13 is, for example, a conductive adhesive. As illustrated in FIG. 2, the second wiring member 5 is electrically connected to the temperature-sensitive film 3 via the conductive film 13 on the X2 side of the base 2. As illustrated in FIG. 2, the first wiring member 4 is connected to the temperature-sensitive film 3 at the end portion 4a on the X1 side, passes through the through-hole 9, and is drawn out toward the X2 side together with the second wiring member 5.

For example, the first wiring member 4 and the second wiring member 5 are lead wires, and the material thereof is not limited as long as the material has electrical conductivity. For example, a coated copper wire or a platinum-based wire obtained by surface-treating a copper-based or nickel-based wire with tin plating, or a platinum-clad nickel-based wire can be preferably used.

The temperature-sensitive film 3 includes connection regions 8 located on both sides of the base 2 in the X1-X2 direction, and a pattern 7 extending from each connection region 8 toward the center of the base 2. The pattern 7 is formed in a spiral shape so as to circle around the surface of the base 2 from the X1 side to the X2 side by trimming. Reference numeral 6 denotes a trimming line. Thus, the surface of the base 2 appears through this trimming line 6. Examples of trimming processing include laser processing and etching processing. The pattern 7 can also be formed by a photolithography technique. As described below, the pattern 7 in FIG. 1 is divided into first patterns 7a to third patterns 7c. However, when the "pattern 7" is simply described, the first patterns 7a to the third patterns 7c are not distinguished from each other, and the pattern 7 indicates the whole pattern.

As illustrated in FIGS. 1 and 2, the width of the pattern 7 is narrower on both sides in the X1-X2 direction than at the center of the base 2. In the embodiment illustrated in FIG. 1, the width of the pattern 7 changes in three stages, and the pattern 7 includes the first patterns 7a located closest to the connection regions 8 and having the narrowest width, the second pattern 7b located at the center of the base 2 and having the widest width, and the third patterns 7c located between the first patterns 7a and the second pattern 7b and having a width wider than those of the first patterns 7a and narrower than that of the second pattern 7b. The patterns 7a to 7c are integrally connected and formed in a series of spiral shapes.

As an example of a method for forming the pattern 7, as illustrated in FIG. 1, after the first patterns 7a having the narrowest width are formed continuously with the connection regions 8 on the X1 side and the X2 side by trimming the temperature-sensitive film 3, the third patterns 7c having the width wider than those of the first patterns 7a are formed continuously with the first patterns 7a, and when the temperature-sensitive film 3 exhibits a predetermined electric resistance value, the trimming is finished. In this case, the second pattern 7b having the widest width remains at the center of the base 2.

The width of the pattern 7 is defined by the width in the X1-X2 direction (the diameter direction of the base 2) illustrated in FIG. 1. Therefore, the width is measured in a planar image appearing in a side view illustrated in FIG. 1. That is, as illustrated in FIG. 1, for example, when each of the first patterns 7a is formed with two turns, and the width is measured along the curved surface of the base 2, the first pattern 7a of the first turn located closest to the connection region 8 in the first pattern 7a is slightly wider than the first pattern 7a of the second turn located adjacent thereto. However, in the present embodiment, the width of the pattern is not the width in the direction along the surface of the base but the width in the direction parallel to the X1-X2 direction. When measured in a direction parallel to the X1-X2 direction, the widths of the first patterns 7a illustrated in FIG. 1 are substantially the same. The same applies to the third patterns 7c.

Figure 4:
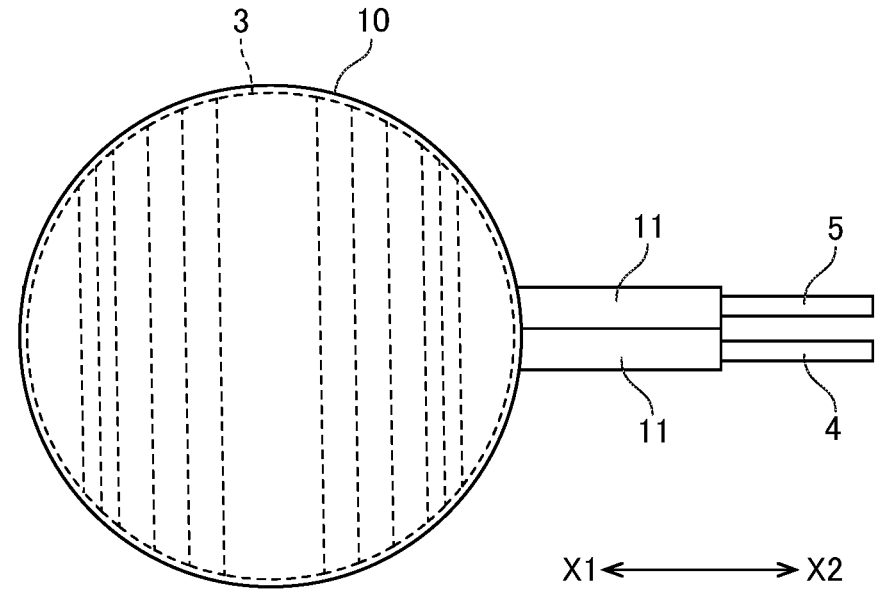
FIG. 4 is a side view of the sensor element in a state where a coating film is provided on the sensor element illustrated in FIG. 1.

In FIGS. 1 to 3, illustration of a coating film on the sensor element 1 is omitted for convenience of description, but actually, as illustrated in FIG. 4, it is preferable that an electrically insulating protective film 10 be formed on the surface of the temperature-sensitive film 3 formed on the surface of the base 2. For example, the protective film 10 can be formed by performing coating, sputtering, or the like. Furthermore, the material of the protective film 10 is not particularly limited as long as the material is an electrically insulating material, but an example of the material is epoxy resin.

As illustrated in FIG. 4, the first wiring member 4 and the second wiring member 5 extending in the same direction (right direction in the drawing) from the X2 side of the base 2 are integrally fixed by a stay 11. Note that the stay 11 is fixed by using, for example, an adhesive. As illustrated in FIG. 4, right end portions (end portions on the X2 side) of the first wiring member 4 and the second wiring member 5 are exposed from the stay 11 and electrically connected to a control device (not illustrated).

Figure 5:
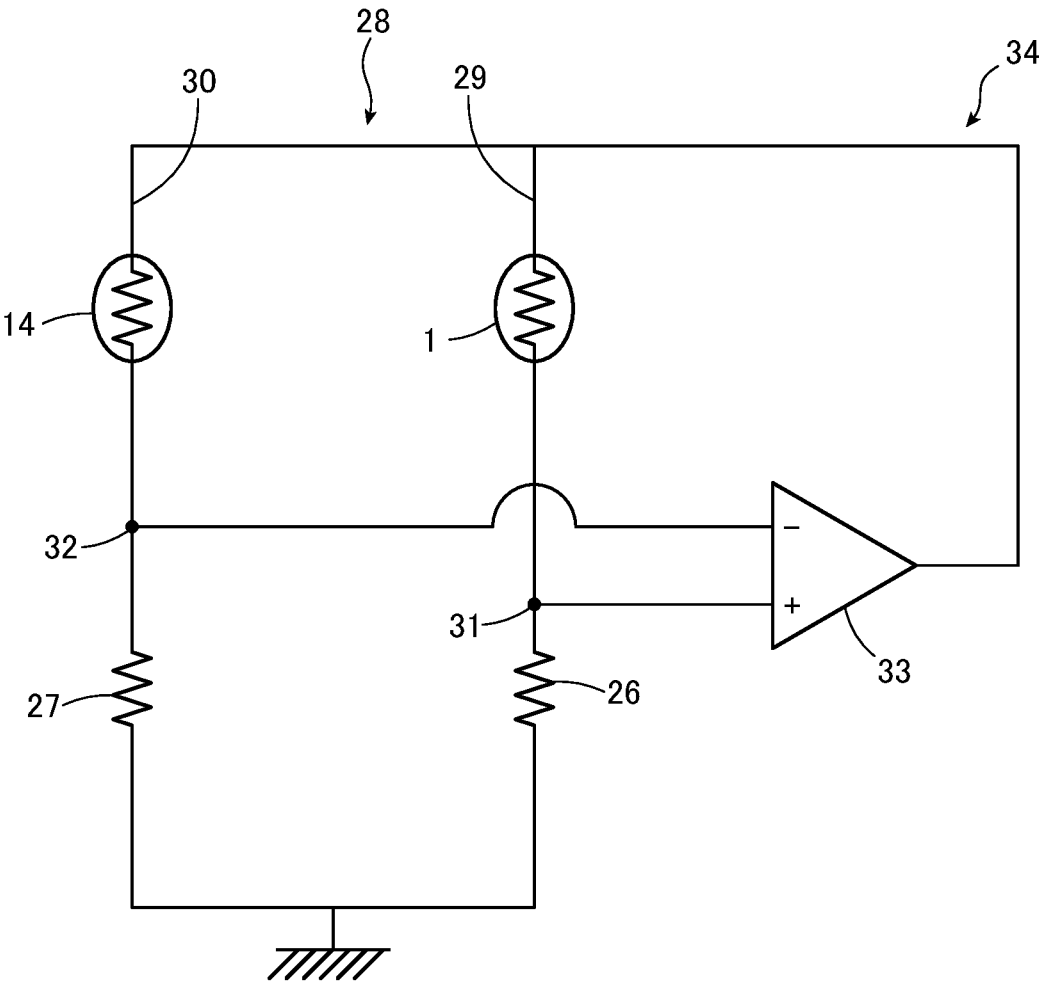
FIG. 5 is a circuit diagram (example) of the sensor element according to the present embodiment.

FIG. 5 is a circuit diagram of a flow rate apparatus including the sensor element 1 according to the present embodiment. As illustrated in FIG. 5, the sensor element 1, a temperature compensation resistor element 14, and resistors 26 and 27 constitute a bridge circuit 28. As illustrated in FIG. 5, the sensor element 1 and the resistor 26 constitute a first series circuit 29, and the temperature compensation resistor element 14 and the resistor 27 constitute a second series circuit 30. Then, the first series circuit 29 and the second series circuit 30 are connected in parallel, and constitute the bridge circuit 28.

As illustrated in FIG. 5, an output unit 31 of the first series circuit 29 and an output unit 32 of the second series circuit 30 are each connected to a differential amplifier (an amplifier) 33. The bridge circuit 28 is connected to a feedback circuit 34 including the differential amplifier 33. The feedback circuit 34 includes a transistor (not illustrated) or the like.

The resistors 26 and 27 have a temperature coefficient of resistance (TCR) that is smaller than those of the sensor element 1 and the temperature compensation resistor element 14. The sensor element 1 is controlled to have a predetermined resistance value Rs1, for example, in a heated state where the temperature is controlled to be higher by a predetermined value than a predetermined ambient temperature. Furthermore, the temperature compensation resistor element 14 is controlled to have a predetermined resistance value Rs2, for example, at the ambient temperature described above. Note that the resistance value Rs1 is smaller than the resistance value Rs2. For example, the resistance value Rs2 is about several times to dozen or so times as large as the resistance value Rs1, but this is not limited. The resistor 26 constituting the first series circuit 29 together with the sensor element 1 is, for example, a fixed resistor having a resistance value R1 similar to the resistance value Rs1 of the sensor element 1. Furthermore, the resistor 27 that constitutes the second series circuit 30 together with the temperature compensation resistor element 14 is, for example, a fixed resistor having a resistance value R2 similar to the resistance value Rs2 of the temperature compensation resistor element 14.

When air strikes the sensor element 1, the temperature of the temperature-sensitive film 3 of the sensor element 1, which is a heat generating resistor, decreases, and the potential of the output unit 31 of the first series circuit 29 to which the sensor element 1 is connected changes. As a result, a differential output is obtained by the differential amplifier 33. Then, in the feedback circuit 34, a driving voltage is applied to the sensor element 1 based on the differential output. The sensor element 1 can calculate and output the wind speed based on a change in voltage required for heating the sensor element 1. When the wind speed changes, the temperature of the temperature-sensitive film 3 changes accordingly, and so that the wind speed can be detected.

The sensor element 1 according to the present embodiment has the following characteristic configuration.

(1) The temperature-sensitive film 3 is formed on the entire surface of the base 2.

(2) The temperature-sensitive film 3 includes the connection regions 8 connected to the wiring members 4 and 5, and the pattern 7 extending from each connection region 8 toward the center of the base 2.

(3) The cross-sectional area of the pattern 7 is formed smaller on the connection region 8 sides than at the center of the base 2.

In the present embodiment, with the configuration of (1), substantially the entire region of the surface of the base 2 can be set as a sensing region. Actually, the sensing region can be formed except for the vicinity of both end portions to which the wiring members 4 and 5 are connected. In the present embodiment, it is possible to obtain non-directivity at 360 degrees around the axis in the X1-X2 direction in which the wiring members 4 and 5 extend.

In the present embodiment, it is possible to suppress unevenness of a temperature distribution in the sensing region by the configurations of (2) and (3) described above, but this point will be described in detail below.

<Regarding Width of Pattern 7>

In the present embodiment, as illustrated in FIG. 1, a width T1 of the first pattern 7a and a width T3 of the second pattern 7b on the connection region 8 side are narrower than a width T2 of the second pattern 7b located at the center of the base 2. Furthermore, the width T1 of the first pattern 7a closer to the connection region 8 is narrower than the width T3 of the third pattern 7c that is closer to the center of the base 2 than the first pattern 7a is. The widths T1 to T3 of the patterns 7a to 7c can also be regarded as intervals (pitches) between trimming lines 6.

Note that, since the base 2 is a sphere, in the front view of FIG. 3, when the widths are faithfully expressed, the widths of the patterns 7a and 7c appear narrower than the actual widths as the distance from the opening of the through-hole 9 increases, but the number of visible trimming lines 6 is reduced, and the third patterns 17c appear wider than the first patterns 7a.

As illustrated in FIG. 1, each of the first patterns 7a and the third patterns 7c is formed with a plurality of turns, all of the plurality of first patterns 7a are formed to have the width T1, and all of the plurality of third patterns 7c are formed to have the width T3. The second pattern 7b having the widest width T2 is formed at the center of the base 2.

Figure 6:
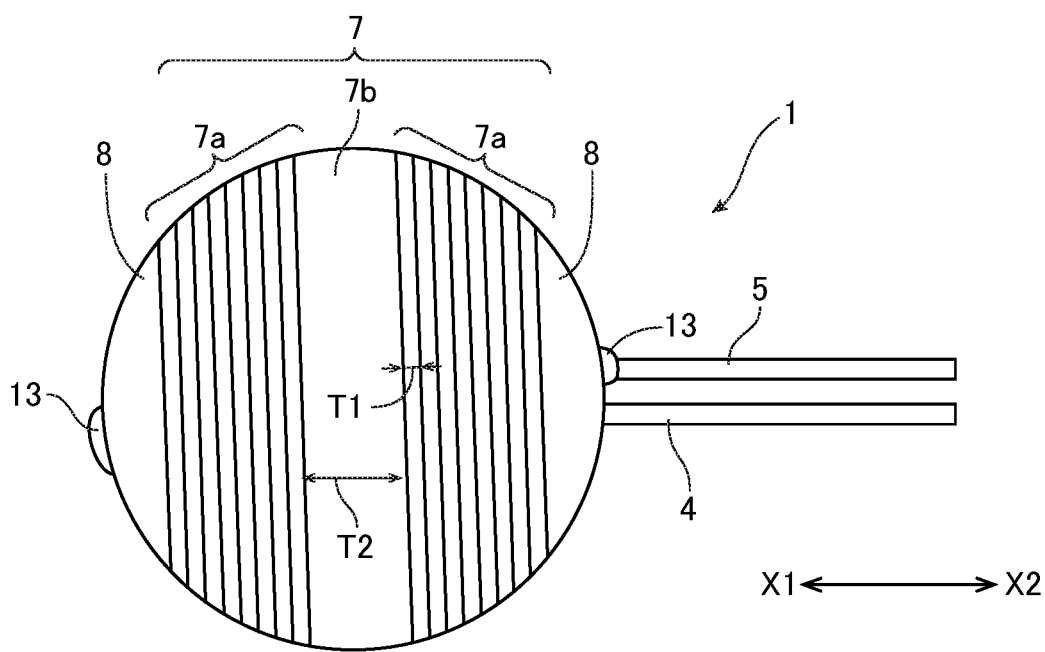
FIG. 6 is a side view of a sensor element according to another embodiment (Example 2) used in a simulation experiment in FIG. 8(a) and different from FIG. 1.

In addition, in another embodiment illustrated in FIG. 6, the pattern 7 includes the first patterns 7a having the width T1 formed on both sides of the base 2 in the X1-X2 direction and the second pattern 7b having the width T2 located at the center of the base 2. As described above, in the embodiment illustrated in FIG. 6, the pattern 7 has two different widths in two stages from the connection region 8 sides toward the center of the base 2.

Figure 7:
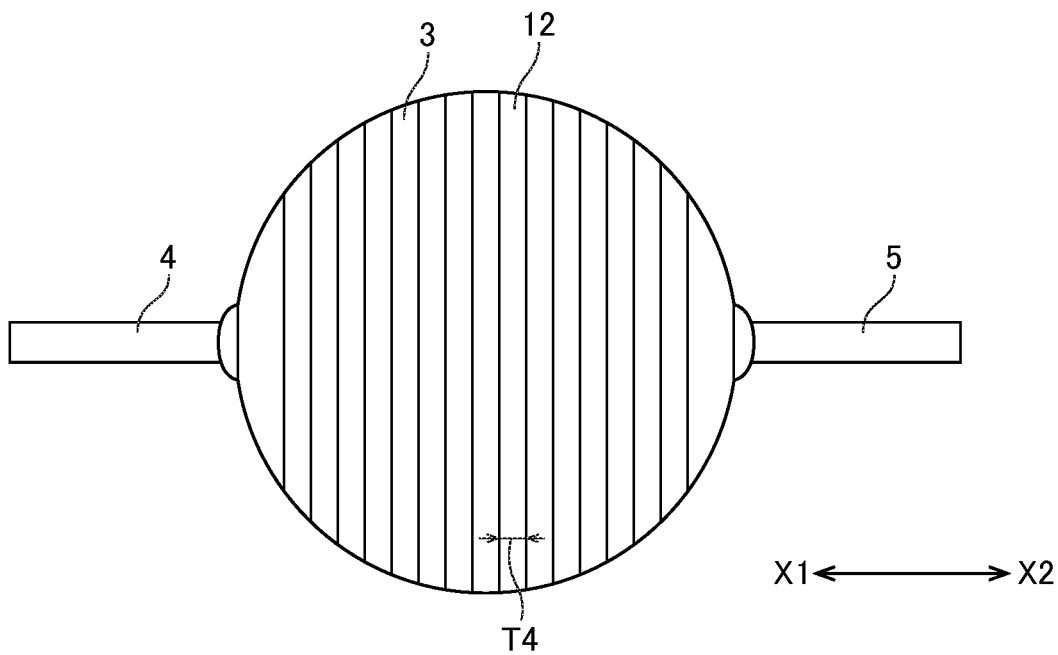
FIG. 7 is a side view of a sensor element according to Comparative Example.

On the other hand, in Comparative Example illustrated in FIG. 7, a pattern 12 having a constant width T4 was formed on an entire temperature-sensitive film 3. In Comparative Example, since the pattern 12 having the constant width T4 is formed as a whole, cross-sectional areas (areas appearing when the pattern 12 is cut in the thickness direction along the width direction) of the pattern 12 are substantially the same, and the calorific value per unit length is substantially uniform. Therefore, the temperature of the temperature-sensitive film 3 is likely to decrease in the vicinity of connection of wiring members 4 and 5, which are a main path of heat dissipation. Therefore, in Comparative Example illustrated in FIG. 7, a thermal equilibrium state is obtained in a state where unevenness of a temperature distribution in a sensing region is large.

Therefore, in each of the embodiments illustrated in FIGS. 1 and 6, the width of the pattern 7 on the connection region 8 side of each of the wiring members 4 and 5 is different from the width of the pattern 7 at the center of the base 2, that is, the first patterns 7a having the narrow width T1 are formed on the connection region 8 sides, and the second pattern 7b having the wide width T2 is formed at the center of the base 2. Thus, the cross-sectional area of the pattern 7 on the connection region 8 side of each of the wiring members 4 and 5 can be made smaller than at the center of the base 2. As described above, the amount of heat generated per unit length in the vicinity of the connection of the wiring members 4 and 5 can be increased, and in a thermal equilibrium state, the unevenness of the temperature distribution in the sensing region can be suppressed as compared with Comparative Example of FIG. 7, and substantially constant sensor sensitivity can be obtained. Note that the sensing region preferably includes at least a region where the pattern 7 is formed, and as for the connection region 8, at least the vicinity of the end portions where the conductive film 13 spreads is preferably not included in the sensing region.

Although the width of the pattern 7 is changed in three stages in the embodiment illustrated in FIG. 1, and the width of the pattern 7 is changed in two stages in the embodiment illustrated in FIG. 6, the width may be changed in four or more stages. In addition, the pattern may be formed such that the width of the pattern gradually increases from the connection region 8 side of each of the wiring members 4 and 5 toward the center of the base 2.

<Experiment on Temperature Distributions in Examples and Comparative Example>

Hereinafter, the temperature distributions of the temperature-sensitive films in Examples 1 and 2 and Comparative Example were compared. The sensor element illustrated in FIG. 1 was used in Example 1, the sensor element illustrated in FIG. 6 was used in Example 2, and the sensor element illustrated in FIG. 7 was used in Comparative Example. In Example 1, the width T1 of the first patterns 7a on the sides close to both ends in FIG. 1 was set to 0.15 mm, and each of the first patterns 7a was formed with a plurality of turns. The width T3 of the third patterns 7c following the first patterns 7a was set to 0.3 mm, each of the third patterns 7c was formed with a plurality of turns, and the temperature-sensitive film 3 was adjusted to have a predetermined electric resistance value. After the resistance adjustment, the second pattern 7b having the widest width T2 was left between the third patterns 7c on both sides.

In Example 2, the width T1 of the first patterns 7a on the sides close to both ends in FIG. 6 was set to 0.15 mm, each of the first patterns 7a was formed with a plurality of turns, and the temperature-sensitive film 3 was adjusted to have a predetermined electric resistance value. After the resistance adjustment, the second pattern 7b having the widest width T2 was left between the first patterns 7a on both sides.

In Comparative Example, the width T4 of the pattern 12 was set to 0.15 mm, the pattern 12 was formed with a plurality of turns, and the pattern 12 was formed on substantially the entire surface of the base 2.

Figure 8A:
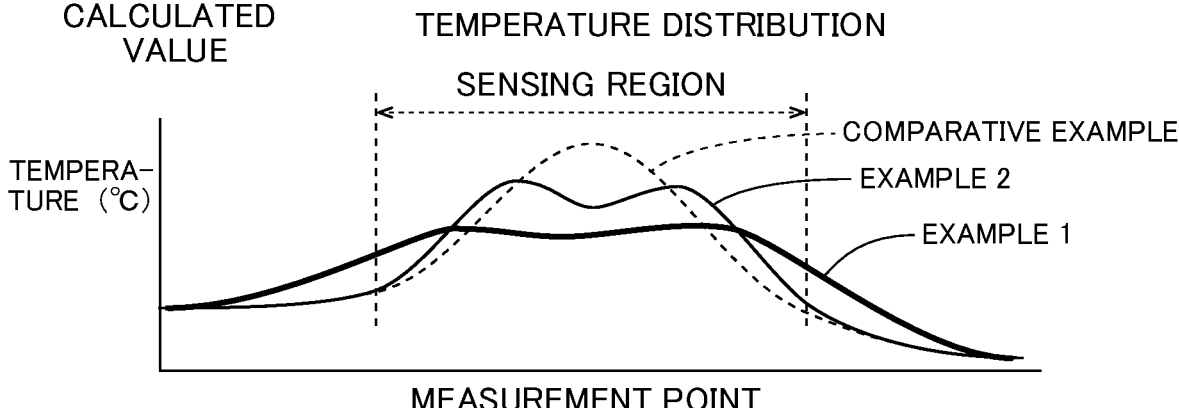
FIG. 8(a) illustrates simulation results (calculated values) of temperature distributions in Examples 1 and 2 and Comparative Example.
Figure 8B:
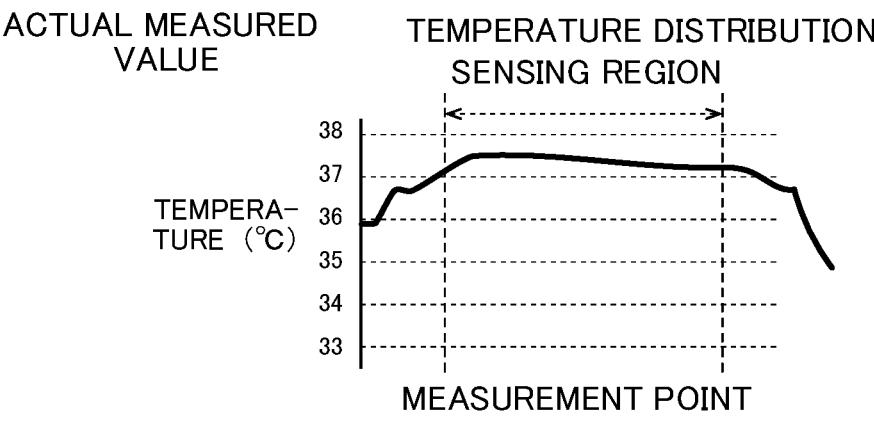
FIG. 8(b) illustrates actual measured values in Example 1.

FIG. 8(*a*) illustrates simulation results (calculated values) of temperature distributions in Examples 1 and 2 and Comparative Example. The horizontal axis indicates a measurement point and corresponds to the X1-X2 direction illustrated in FIGS. 1, 6, and 7.

As illustrated in FIG. 8(*a*), in Comparative Example in which the pattern 12 having the constant width T4 is formed as a whole, the temperature distribution became large, and in particular, it was found that the temperature rapidly decreased on both sides of the sensing region (near both sides in the X1-X2 direction). On the other hand, in Examples 1 and 2, the temperature distribution in the sensing region could be improved as compared with Comparative Example. In particular, in Example 1 illustrated in FIG. 1 in which the width of the pattern was narrowest on the connection region 8 sides and widest at the center of the base 2, and the third patterns 7c having the intermediate width were formed between the first patterns 7a near the connection regions and the second pattern 7b at the center of the base 2, the temperature distribution in the sensing region was made substantially constant as compared with Example 2. In Example 2 in which the first patterns 7a having the narrow width were formed on the connection region 8 sides and the second pattern 7b having the wide width was formed at the center, it was found that particularly the temperature distribution near the center among the measurement points can be suppressed as compared with Comparative Example.

Next, the temperature distribution of the temperature-sensitive film in the X1-X2 direction was measured using Example 1. The temperature distribution was measured using a thermotracer CPA-T530sc. In the experiment, power of 24 mW was applied between the wiring members 4 and 5, and the temperature distribution of the temperature-sensitive film 3 was measured with the thermotracer. The experimental results are illustrated in FIG. 8(*b*). As illustrated in FIG. 8(*b*), it was found that the temperature distribution in the sensing region could be made substantially constant.

As described above, it was found that by forming the sides close to the connection regions 8 of the wiring members 4 and 5 with the first patterns 7a having the narrow width T1 and forming the center of the base 2 with the second pattern 7b having the width T2 wider than the width T1, the temperature distribution in the sensing region could be made substantially constant as compared with the case of forming the pattern 12 having the constant width T4 as a whole as in Comparative Example. In this manner, it is possible to improve the unevenness of the temperature distribution in the sensing region and to obtain uniform sensor sensitivity in the sensing region.

As described above, in the sensor element 1 according to the present embodiment, by providing the configurations of (1) to (3) described above, the sensing region can be widened, the unevenness of the temperature distribution in the sensing region can be improved, and substantially constant sensor sensitivity can be obtained. In particular, in the present embodiment, the wind speed can be detected regardless of which direction the wind blows in 360 degrees around the axis (360 degrees around the X1-X2 direction), the substantially constant sensor sensitivity can be obtained, and the non-directivity at 360 degrees around the axis can be improved.

In the above embodiment, the width of the pattern 7 is changed, but the thickness of the pattern 7 may be changed to adjust the cross-sectional area of the pattern 7 to be smaller on the connection region 8 sides than at the center of the base 2. This makes it possible to increase the amount of heat generated per unit length in the vicinity of the connection between the wiring members 4 and 5. Therefore, it is possible to suppress the unevenness of the temperature distribution in the sensing region and to substantially uniformize the sensor sensitivity.

Alternatively, by changing both the width and the thickness of the pattern 7, or by changing the width of a portion of the pattern 7 and changing the thickness of the remaining portion of the pattern 7, the cross-sectional area of the pattern 7 may be made smaller on the connection region 8 sides than at the center of the base 2.

However, the adjustment of the width is more reliable and simpler than the adjustment of the thickness, and thus it is preferable to adjust the width of the pattern 7 in the vicinity of the connection region 8 of each of the wiring members 4 and 5 to be smaller than the width of the pattern 7 at the center of the base 2.

Figure 9:
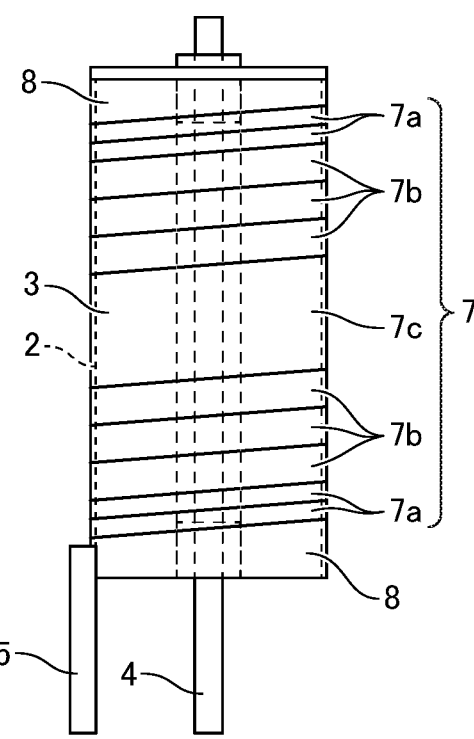
FIG. 9 is a side view illustrating a variation of the sensor element according to the present embodiment.

Furthermore, in the present embodiment, the base 2 is a sphere. Therefore, the size can be reduced, excellent responsiveness can be achieved, and an effect of hardly disturbing an air flow is obtained. However, the base 2 is not limited to a sphere. For example, the base 2 may be an ellipsoid, have a cylindrical shape illustrated in FIG. 9, or the like. In an embodiment illustrated in FIG. 9, a temperature-sensitive film 3 is formed on an entire surface of a cylindrical base 2, and the temperature-sensitive film 3 has connection regions 8 to which wiring members 4 and 5 are connected, and a pattern 7 extending spirally from the connection regions to the center of the base 2. The width of the pattern 7 is narrower on the connection region 8 sides than at the center of the base 2. Also in the embodiment illustrated in FIG. 9, similarly to FIG. 1, the width of the pattern 7 is narrowest on the connection region 8 sides and widest at the center of the base 2, and third patterns 7c having an intermediate width are formed between first patterns 7a near the connection regions and a second pattern 7b at the center of the base 2. As a result, a sensing region can be widened, the heat generation can be increased in the vicinity of the connection of the wiring members 4 and 5, the unevenness of the temperature distribution in the sensing region can be suppressed, and the sensor sensitivity can be substantially uniformized. In particular, in the present embodiment, the non-directivity at 360 degrees around the axis can be improved.

Figure 10:
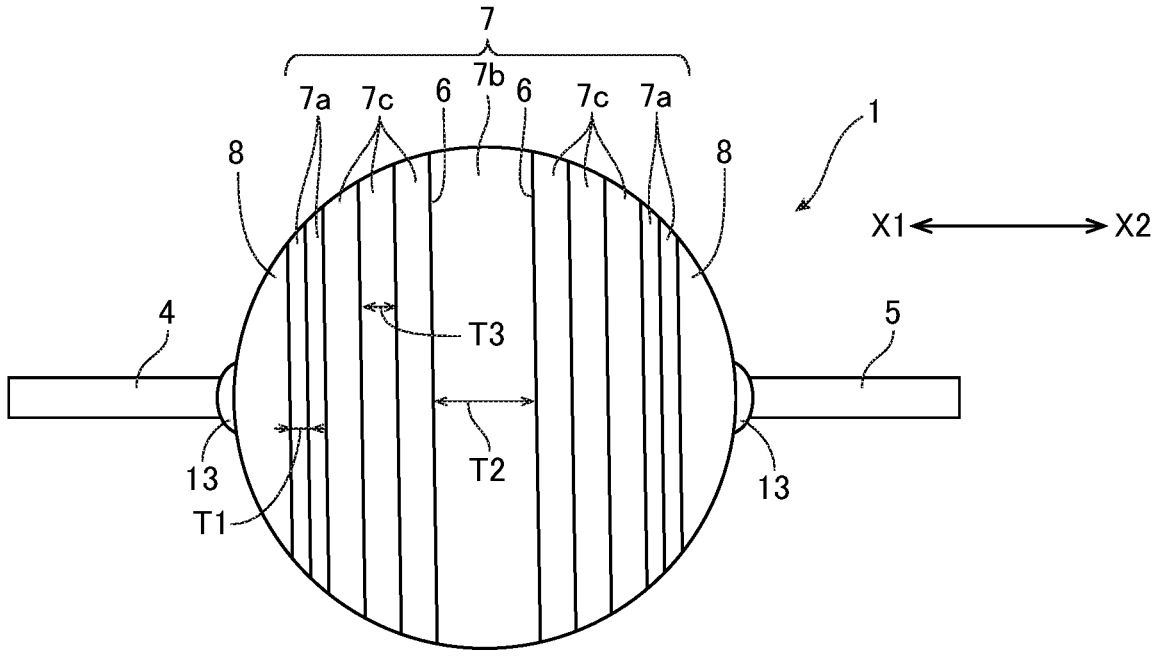
FIG. 10 is a side view illustrating a variation of the sensor element according to the present embodiment.

In another embodiment illustrated in FIG. 10, unlike FIG. 1, a first wiring member 4 and a second wiring member 5 each extend in a direction away from both ends of a temperature-sensitive film 3 in the X1-X2 direction to the outside. Also in the embodiment illustrated in FIG. 10, the temperature-sensitive film 3 is formed on an entire surface of a base 2, the temperature-sensitive film 3 has a pattern 7, and the width of the pattern 7 is narrower on the connection region sides of the wiring members 4 and 5 than at the center of the base 2. As a result, a sensing region can be widened, heat generation can be increased in the vicinity of the connection of the wiring members 4 and 5, unevenness of a temperature distribution in the sensing region can be suppressed, and sensor sensitivity can be substantially uniformized. In particular, non-directivity at 360 degrees around the axis (360 degrees around the X1-X2 direction) can be improved. In the embodiment illustrated in FIG. 10, unlike the embodiment illustrated in FIG. 1, the base 2 does not need to be provided with a through-hole 9.

In the present embodiment, as the sensor element 1, the wind sensor element has been described as an example. However, a sensor element that can sense the flow speed of liquid may be used.

INDUSTRIAL APPLICABILITY

According to the present invention, it is possible to suppress the unevenness of the temperature distribution in the sensing region, and to manufacture a sensor element having non-directivity and excellent sensor sensitivity. Therefore, the present invention can be preferably applied to applications in which the direction of the fluid is not constant. In the present invention, the sensor element can be used regardless of the outdoors or the indoors. When a light emitting element such as an LED is disposed in the sensor element of the present invention and configured to emit light when wind is detected, the light emitting element can be applied to illumination and the like. Furthermore, the sensor element of the present invention can also be applied for experiments, analysis, and the like.

The present application is based on Japanese Patent Application No. 2021-085160 filed on May 20, 2021. The entire contents thereof are incorporated herein by reference.

The invention claimed is:

1. A sensor element, comprising:
a spherical base;
a temperature-sensitive film formed on an entire surface of the spherical base and having an electric resistance value that changes due to a change in temperature; and
a wiring member connected to opposing ends of the temperature-sensitive film,
wherein the temperature-sensitive film includes connection regions connected to the wiring member and a pattern defined by recessed lines formed in the temperature-sensitive film,
wherein the pattern extends from each of the connection regions toward a center of the spherical base,
wherein a cross-sectional area of each section of the pattern that borders the connection regions is formed smaller than a section of the pattern at the center of the spherical base,
wherein each section of the pattern is defined between adjacent recessed lines, and
wherein the section of the pattern at the center of the spherical base is wider than each section of the pattern that borders the connection regions.

* * * * *